United States Patent Office 3,518,398
Patented June 30, 1970

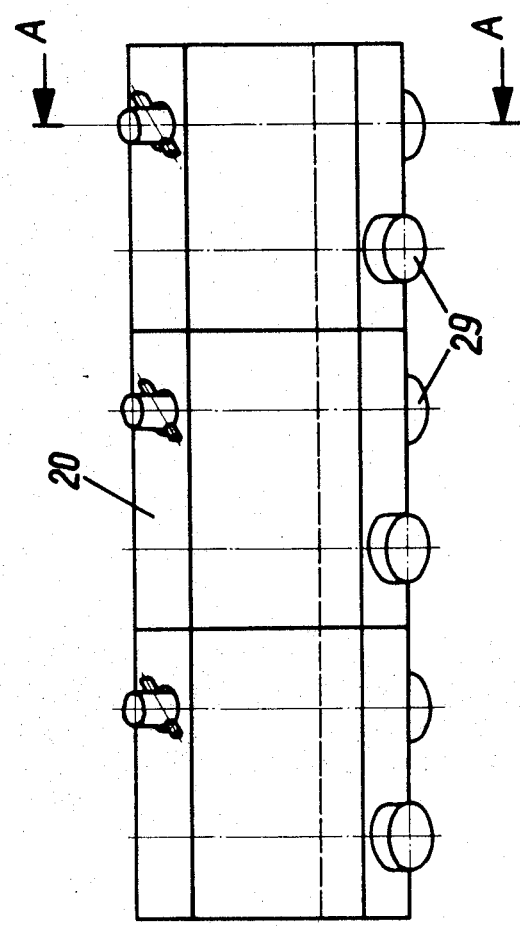
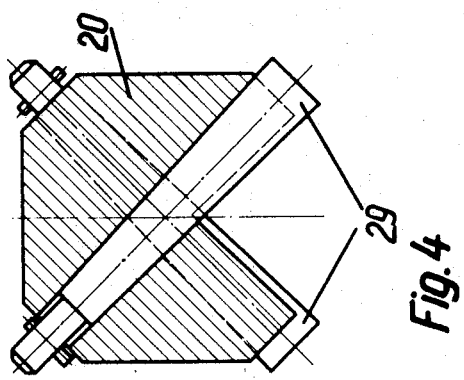

3,518,398
BUTT-WELDING DEVICE FOR BILLETS
Emil Denzler, Schlieren, and Hans Rudolf Zollinger, Geroldswil, Switzerland, assignors to H. A. Schlatter AG., Schlieren, Switzerland, a joint-stock company
Filed Oct. 20, 1967, Ser. No. 676,776
Claims priority, application Switzerland, Oct. 28, 1966, 15,639/66
Int. Cl. B23k 11/04
U.S. Cl. 219—101
6 Claims

ABSTRACT OF THE DISCLOSURE

Apparatus for welding together preheated material. The device consists of at least one resistance flash-butt welding machine which is movable along guide rails. Each machine consists of two pivotably connected clamping devices, the lower parts of which are submerged in a reservoir containing a cooling medium.

---

The invention concerns a device for welding together preheated material, such as for instance billets or blocks preheated in a furnace, so as to obtain a string of billets or blocks which are joined together and pass continuously to a rolling mill. The device consists of at least one resistance flash-butt welding machine which can be moved along guide rails by means of a known type of drive, so that during the time a fresh billet is being welded to the existing billet or string of billets, it moves with the latter and upon completion of the joint is moved back in the opposite direction so as to be ready for welding the next billet.

The object of the invention is to adapt the welding machine or machines of such a device so as to suit the limited space available and the prevailing thermal conditions, whilst at the same time taking into account the accumulation of scale and weld spatter as well as the sequence of difficult working conditions encountered by such a device.

It is known to move the welding machine together with the preheated billet and to weld the billets together to form a continuous string of billets whilst the machine is in motion. All known machines of this kind possess however, the disadvantages that they occupy a considerable amount of space and cannot therefore be used in conjunction with conventional rolling mills, or they are so complicated and inaccessible that it is almost impossible to apply them in practice.

Moreover, these machines are continuously exposed to the dirt which occurs in rolling mills, whereby the efficiency of the machines is greatly reduced.

The problem to be solved by the invention is thus to construct the welding machine or machines of a device of the aforementioned kind so that they are so narrow that they can be arranged next to each other just like a number of parallel billet strings and also at the same time to provide special means for cooling the machines, which move in parallel tracks immediately next to each other, and to protect them from the dirt resulting from scale and weld spatter.

In accordance with the invention this is achieved in that above and below the welding machine there is at least one rail which serves to carry and guide the machine and that the machine has a two-part frame whereby one part carries the clamping device for the string of billets that are joined together and the other part the clamping devices for the billet that has to be welded to the preceding billet, both parts of the frame being connected together by way of a common pivot perpendicular to the axis of the string of billets.

It is preferable to support and guide the machine in a lower rail, whilst the upper rail serves only as a guide rail. Thus the frame which carries the upper guide rail has only to deal with relatively small guiding forces, the weight of the machine being supported by the lower rail which is directly fixed to a base plate.

Since each clamping device is pivotable with respect to the other one and is not mounted on a carriage or slide as in the case of the hitherto known types of flash-butt welders, the weight and width of the machine is greatly diminished and the difficulties of preventing the carriage guides from being choked by scale and spatter are avoided. It is preferable to locate the swivel axis at the upper end of the machine vertically above the welding point.

A constructional example of the invention is explained by reference to the accompanying drawing which shows the main elements of a device for welding together the billets coming from a furnace and passing to a rolling mill in four continuous strings of billets.

FIG. 3 shows one clamping and current supply jaw of the machine in lateral elevation whilst FIG. 4 is a cross-sectional view taken on the line A—A of FIG. 3.

Figure 1:
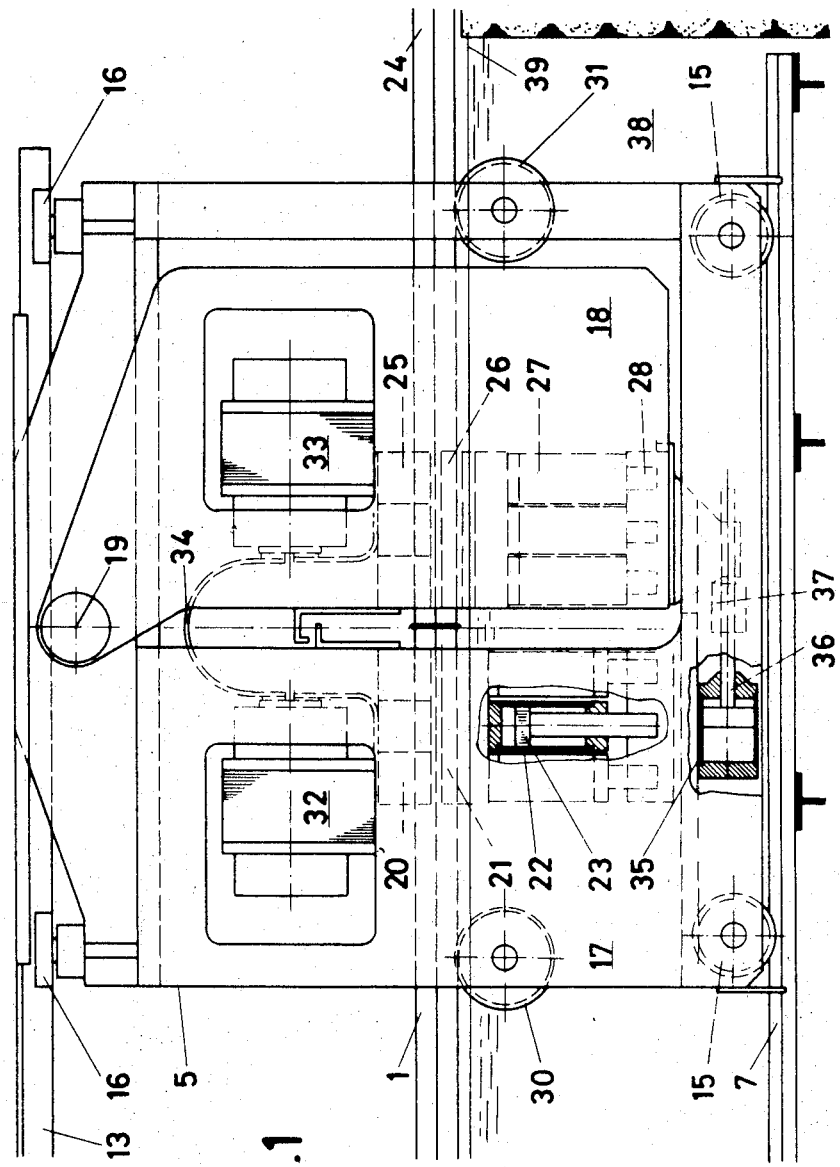
FIG. 1 shows in lateral elevation one flash-butt welding machine of the device together with the rails for guiding and supporting the machine, as well as the end of the billet string together with a billet welded to the string.
Figure 2:
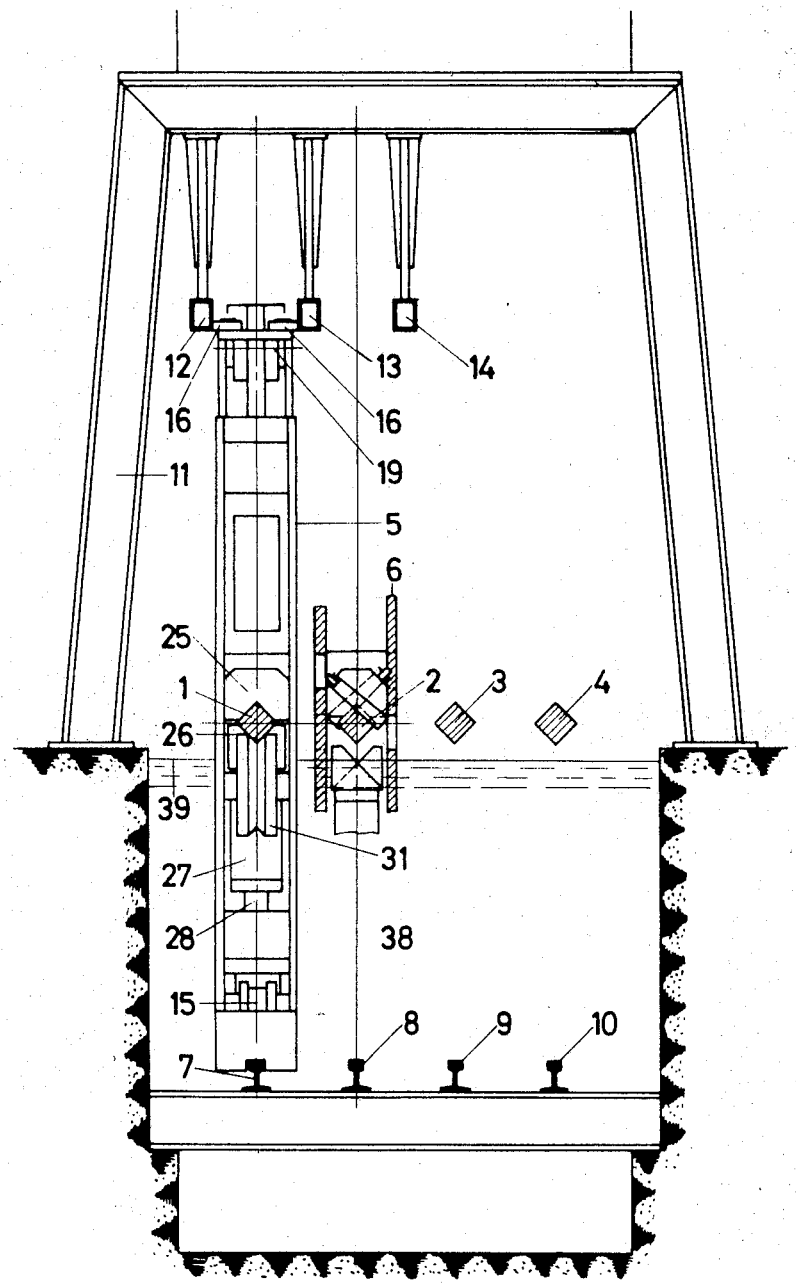
FIG. 2 shows an end view of the device, only one welding machine, part of a second machine, and some of the rails being visible.

The device shown in the drawing has a flash butt welding machine for each of the four billet strings 1, 2, 3 and 4, only the essentially components of machine 5 for the billet string 1 and a detail of machine 6 for billet string 2 being shown. Each of these machines is supported and guided by a rail 7, 8, 9 and 10 which is located underneath the machine. A frame 11 carries five upper guide rails of which only rails 12, 13 and 14 are shown. The upper end of a welding machine is located between two neighbouring rails which serve to guide the machine. Welding machine 5 has lower rollers 15 which run on a rail 7 and upper rollers 16 which run on guide rails 12 and 13.

The frame of the machine 5 consists of two parts 17 and 18 the upper ends of these parts being connected together by way of a pivot 19 above which they can swivel. This pivot is located vertically above the point where the billets are welded together and is arranged to be perpendicular to the longitudinal axis of the billets. Rollers 15 and 16 are mounted on the frame part 17. This part 17 is provided with a clamping device for the billet string 1 and consists of an upper jaw 20 fixed to frame part 17 and a lower jaw 21. The lower jaw 21 is fixed to the cylinders 22 of three piston-cylinder unis of which the pistons 23 are fixed to the part 17. The other frame part 18 is provided with a clamping device for the billet 24 that has to be welded to the end of billet string 1 and is shown in FIG. 1 after the weld has already been made. This clamping device comprises an upper jaw 25 fixed to the frame part 18 and a lower jaw 26 which is fixed to the cylinders 27 of three piston-cylinder units of which the piston rods 28 are fixed to the frame part 18.

In order to improve the current transmission between the upper jaws 20, 25 and the string of billets 1 and billet 24 respectively, removable bolts 29 are inserted into the jaws 20, 25 in such a manner that part of the surface of these bolts projects beyond the surface of the clamping jaws so that when the latter are brought into the clamping position the oxidized or encrusted surface of the billets is broken down due to the larger specific pressure exerted by the bolts.

Two rollers 30 and 31 serve to support the string of billets 1 and the billet 24 that has to be welded to the preceding billet.

Frame parts 17 and 18 each serve to accommodate a welding transformer 32 and 28 respectively which is located directly above the clamp jaw 20 and 25. One end of the secondary winding of each transformer 32 and 33 is directly connected to the corresponding jaw 20 and 25, the other ends of the secondary windings being connected together by means of a flexible conductor 34.

At the lower end of machine 5 there is a piston-cylinder unit which produces the movement of the workpiece required for the flash-butt welding operation. The cylinder 35 of the unit is fixed to frame part 17 and the piston rod 36 to part 18 by means of a flexible element, for instance a leaf spring element 37. The flexibility of the leaf spring element 37 acts in a direction perpendicular to the pivot axis 19 and avoids the provision of any sliding support which is subject to wear.

All four flash-butt welding machines move in a water tank 38 where the water is maintained at a level 39 where the piston-cylinder units of the lower jaws of the clamping devices of the welding machines, in this case for instance the piston-cylinder units 22, 23 and 27, 28 of machine 5 are kept continuously under water and the lower jaws, for instance jaws 21 and 26 of machine 1, are at least partly submerged in the water tank when the clamping device has been released and the jaws are in the retracted position.

The welding machine 5 is stationary in its initial position and the string of billets 1 which is drawn into the mill moves through the machine. As soon as the end of the billet string reaches the machine the latter is accelerated to such an extent and brought into synchronism with the speed of the billet string that when the clamping operation occurs the ends of the billet string will lie between the two electrodes 20 and 25. At the same time a fresh billet 24 is feed into the device in such a way that the beginning of the fresh billet, after the billet string has been clamped, reaches the welding position and can also be clamped. Thereupon the flash-butt welding process is initiated. After the welding process is finished, clamping devices 21, 26 open and machine 5 which has been released from the billet string 1 is braked and moved back into the starting position. The main advantages which are achieved by means of the device according to the invention are the light and compact construction of the machines which can easily move along rails, whereby several machines can be arranged side by side with a very small spacing and the scale and spatter caused by the welding, collects in a water bath where it is flushed away, whilst at the same time the machines are cooled and kept clean. When compared with conventional butt-welding machines, not the upper but the lower jaws of the clamping devices are retracted in order to release the billets with the result that the billet string moves only on rollers when after a billet has been welded the machine moves in the reverse direction to that of the billet string for the next welding operation. The string of billets does not slide in the jaws because due to its own weight it sags slightly and is therefore removed from the upper jaws without, however, coming into contact with the retracted lower jaws. In this way any undesirable additional cooling of the material to be welded is avoided. The bolts in the upper current conductive jaws improve the current transmission, avoid wear of the jaws, and can be easily replaced.

We claim:
1. Apparatus for welding together successively pieces of preheated material so as to form at least one continuous string of welded pieces, which comprises:
   at least one flash-butt welding machine,
   guide rails along which the machine is movable during welding by means of a drive, at least one rail being disposed above the welding machine and at least one rail being below the machine,
   one at least of which rails serves to support the machine;
   the machine having a frame divided into two parts,
   one part of said frame carrying a first device for clamping a piece or string of pieces; and
   the other part of said frame carrying a second clamping device for a succeeding piece to be welded to the aforesaid piece or string of pieces, each of said first and second clamping devices having upper and lower jaws;
   mechanism for actuating said lower jaws;
   the two parts of said frame being connected together by way of a pivot having its axis perpendicular to the path of said pieces through the apparatus; and
   a reservoir adapted to contain a cooling medium, said reservoir being so disposed with respect to said welding machine and said actuating mechanism that a lower part of said welding machine and said actuating mechanism are submerged when said reservoir contains a body of cooling medium.

2. Apparatus as defined in claim 1, in which the upper jaws of the clamping devices are current-conductive and stationary, and in which the lower jaws are movable, said lower jaws when in the retracted position being at least partly submerged in said reservoir.

3. Apparatus as defined in claim 1, wherein the clamping devices are hydraulically actuated by hydraulic piston-cylinder units, the cylinders being rigidly connected to the lower clamping jaws and the pistons being stationary with respect to the upper jaws corresponding to said lower jaws.

4. Apparatus as defined in claim 2, in which is comprised a hydraulic piston-cylinder unit for moving the workpiece during the flash-butt welding operation, and in which outlets for the pressure fluid of the hydraulic piston-cylinder unit and of the hydraulic mechanism for actuating the lower clamps, as well as outlets for the cooling medium, are connected to the reservoir.

5. Apparatus as defined in claim 1, wherein said welding machine comprises two welding transformers which are each located in the immediate vicinity of one of the clamping devices, the secondary windings of said transformers being connected in series.

6. Apparatus as defined in claim 5, wherein one end of the secondary winding of each transformer is directly and rigidly connected to the corresponding jaw, and the other ends of the secondary windings are connected together by means of a flexible conductor.

References Cited
UNITED STATES PATENTS

| | | | |
|---|---|---|---|
| 1,270,786 | 7/1918 | Clapper | 219—116 |
| 1,727,166 | 9/1929 | Frick | 219—119 |
| 1,833,660 | 11/1931 | Siebs et al. | 219—95 |
| 3,036,204 | 5/1962 | Stieglitz et al. | 219—101 |

JOSEPH V. TRUHE, Primary Examiner

L. A. SCHUTZMAN, Assistant Examiner

U.S. Cl. X.R.

219—95, 97; 228—44, 46